US009021061B2

(12) United States Patent
Yang

(10) Patent No.: US 9,021,061 B2
(45) Date of Patent: Apr. 28, 2015

(54) METHOD AND APPARATUS FOR ACCOMMODATING OVERLAPPING WIRELESS NETWORKS

(75) Inventor: Guang Yang, San Jose, CA (US)

(73) Assignee: Core Wireless Licensing S.A.R.L., Luxembourg (LU)

( * ) Notice: Subject to any disclaimer, the term of this patent is extended or adjusted under 35 U.S.C. 154(b) by 792 days.

(21) Appl. No.: 12/643,037

(22) Filed: Dec. 21, 2009

(65) Prior Publication Data

US 2010/0161765 A1     Jun. 24, 2010

Related U.S. Application Data

(60) Provisional application No. 61/140,044, filed on Dec. 22, 2008.

(51) Int. Cl.
*G06F 15/16*     (2006.01)
*H04L 29/12*     (2006.01)

(52) U.S. Cl.
CPC ........ *H04L 29/12594* (2013.01); *H04L 61/303* (2013.01); *H04M 2250/06* (2013.01)

(58) Field of Classification Search
CPC ........... H04L 29/12594; H04L 61/303; H04M 2250/06
USPC ....................................................... 709/219
See application file for complete search history.

(56) References Cited

U.S. PATENT DOCUMENTS

| 7,120,438 B2 * | 10/2006 | Omar et al. ................. 455/435.1 |
| 2008/0119200 A1 * | 5/2008 | McConnell ................. 455/456.1 |

OTHER PUBLICATIONS

Wikipedia, "Uniform Resource Identifier", http://en.wikipedia.org/wiki/Uniform_Resource_Identifier, retrieved Aug. 30, 2011, 7 pages.
Berners-Lee, "Uniform Resource Identifier (URI): Generic Syntax", Network Working Group, Jan. 2005, 55 pages.
Python, "Python Programming Language—Official Website", http://www.python.org, retrieved Aug. 30, 2011, 3 pages.
Python, "20.16 Urlparse—Parse URLs into Components", http://docs.python.org/lib/module-urlparse.html, retrieved Aug. 30, 2011, 7 pages.

* cited by examiner

*Primary Examiner* — Maceeh Anwari
(74) *Attorney, Agent, or Firm* — Core Wireless Licensing S.A.R.L.

(57) ABSTRACT

A method comprises forming a pathname indicative of a location of content on a wireless network, the pathname including an identifier of the wireless network; and sending a request for the content, the request including the pathname. In one embodiment, the pathname further includes a delimiter configured to specify a location of the identifier of the wireless network in the pathname.

9 Claims, 5 Drawing Sheets

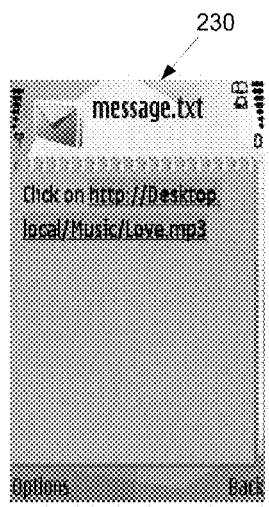 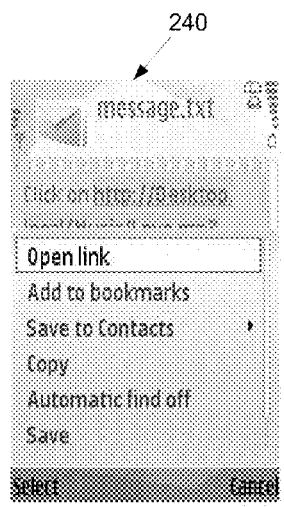 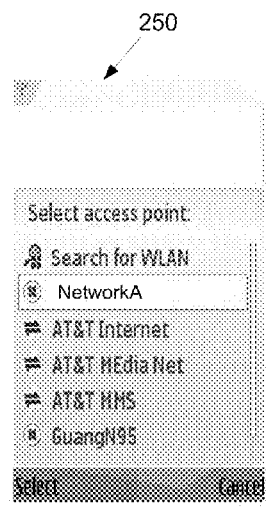
Figure 2A  Figure 2B  Figure 2C
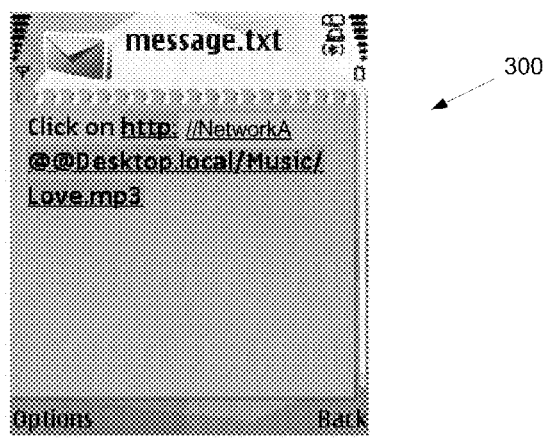
Figure 3

METHOD AND APPARATUS FOR ACCOMMODATING OVERLAPPING WIRELESS NETWORKS

CROSS-REFERENCE

This application claims priority to U.S. Provisional Patent Application Ser. No. 61/140,044 filed on Dec. 22, 2008.

FIELD OF INVENTION

This invention relates to wireless communication. In particular, certain embodiments of the present invention relate to accommodating multiple wireless networks that overlap.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The availability of off-the-shelf, inexpensive switches/routers/gateways allows individuals to set up their own computer network in minutes. As a result, the number of networks has grown exponentially, particularly due to the surging popularity of Wi-Fi. As the number of wireless networks increases, there is increased likelihood of overlapping of such networks, geographically and temporally. Often, users encounter multiple Wi-Fi networks covering the same area at the same time, and the user has to choose which one to use.

SUMMARY OF THE INVENTION

In one aspect of the invention, a method comprises forming a pathname indicative of a location of content on a wireless network, the pathname including an identifier of the wireless network; and sending a request for the content, the request including the pathname. In one embodiment, the pathname further includes a delimiter configured to specify a location of the identifier of the wireless network in the pathname. In one embodiment, the delimiter is "@@". The pathname may be configured as: networkname@@hostname/contentaddress, wherein "networkname" is the identifier of the wireless network, wherein "hostname" indicates a host device on the wireless network, and wherein "contentaddress" indicates the location of the content on the host device.

In another aspect, a method comprises receiving a request for content by an access point, the request including a pathname indicative of the content; parsing the pathname to extract an identifier of a wireless network; and providing access to the content if the identifier of the wireless network corresponds to a wireless network associated with the access point.

[In another aspect of the invention, an apparatus comprises a processor and a memory unit communicatively connected to the processor. The memory unit includes computer code for forming a pathname indicative of a location of content on a wireless network, the pathname including an identifier of the wireless network; and computer code for sending a request for the content, the request including the pathname.

In another aspect of the invention, an apparatus comprises a processor and a memory unit communicatively connected to the processor. The memory unit includes computer code for receiving a request for content by an access point, the request including a pathname indicative of the content; computer code for parsing the pathname to extract an identifier of a wireless network; and computer code for providing access to the content if the identifier of the wireless network corresponds to a wireless network associated with the access point.

In another aspect of the invention, a computer program product, embodied on a computer-readable medium, comprises computer code for forming a pathname indicative of a location of content on a wireless network, the pathname including an identifier of the wireless network; and computer code for sending a request for the content, the request including the pathname.

In another aspect, a computer program product, embodied on a computer-readable medium, comprises computer code for receiving a request for content by an access point, the request including a pathname indicative of the content; computer code for parsing the pathname to extract an identifier of a wireless network; and computer code for providing access to the content if the identifier of the wireless network corresponds to a wireless network associated with the access point.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Example embodiments of the invention are described by referring to the attached drawings, in which:

FIGS. 2A-2C illustrate conventional selection of an available wireless network;

FIG. 3 is illustrates an exemplary screen shot of an exemplary pathname for accommodating overlapping wireless networks in accordance with an embodiment of the present invention;

DETAILED DESCRIPTION OF THE VARIOUS EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As noted above, users often encounter multiple Wi-Fi networks covering the same area at the same time. In such an environment, a user requesting content using an Internet Protocol (IP) address or domain name may encounter ambiguity. For example, the following scenario is considered with reference to FIG. 1.

Figure 1:
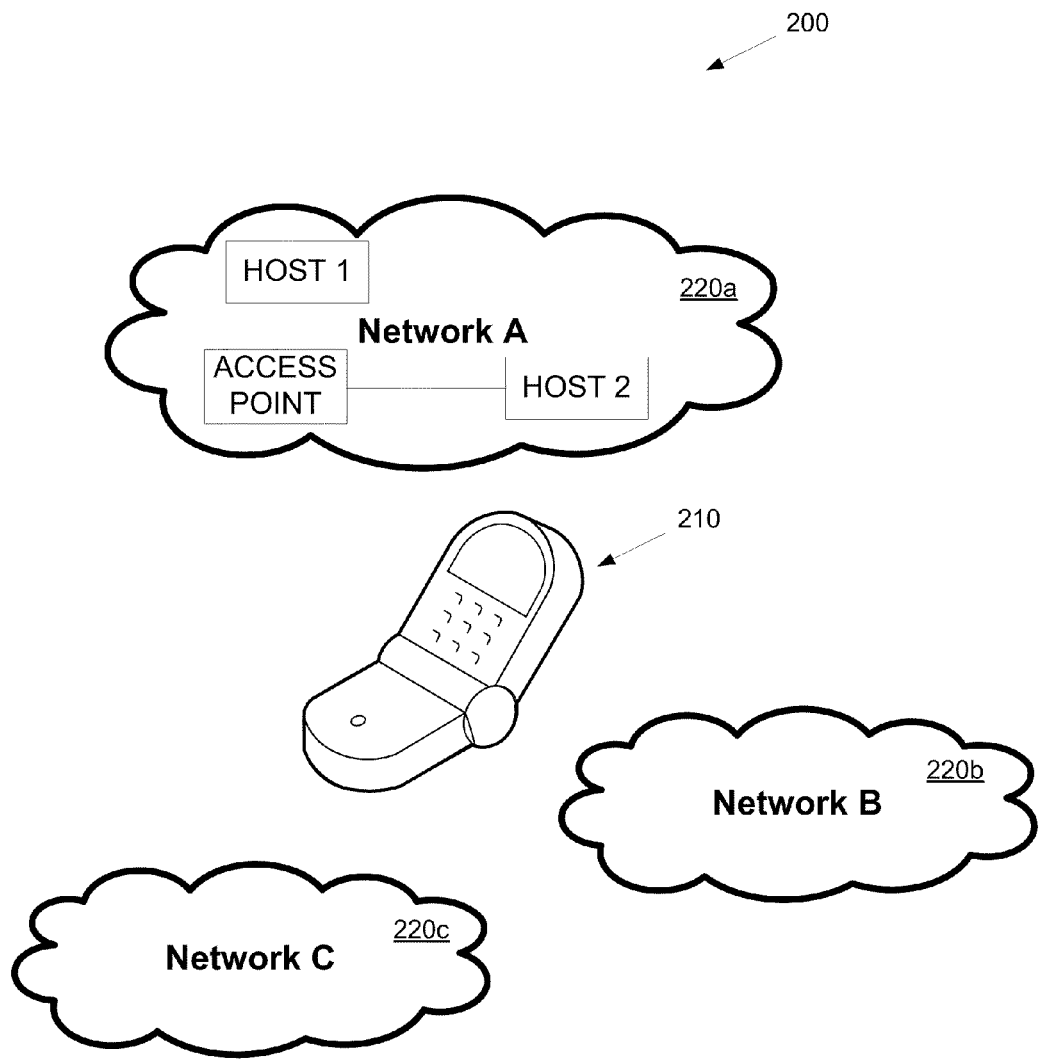
FIG. 1 illustrates an exemplary arrangement in which certain embodiments of the present invention may be implemented.

FIG. 1 illustrates an exemplary arrangement 200 in which certain embodiments of the present invention may be implemented. User A and User B are neighbours who have each set up a home Wi-Fi wireless local area network (WLAN). User A names her network "Network A" 220a and User B names his network "Network B" 220b. Each network 220a, 220b may include an access point, such as a wireless router, and one or more host devices, such as home computers, laptops or other such communication devices. As one such host device, User A has a home computer which is named "Desktop". Similarly, User B also has a home computer and also names it "Desktop." Both computers may be referred to as "Desktop.local" in their respective local Wi-Fi networks 220a, 220b.

User A may send a Uniform Resource Identifier (URI) to another user to share content, such as a song, on the home computer of User A. A URI is a compact string of characters used to identify or name a resource. The main purpose of this identification is to enable interaction with representations of the resource over a network, such as the World Wide Web, using specific protocols. URIs are defined in schemes defining a specific syntax and associated protocols.

URIs typically have a defined syntax, such as:

```
URI = scheme ":" hier-part [ "?" query ] [ "#" fragment ]
hier-part = "//" authority path-abempty / path-absolute / path-rootless / path-empty
authority = [ userinfo "@" ] host [ ":" port ]
host = IP-literal / IPv4address / reg-name
```

Sample URI' s may include

```
ftp://ftp.is.co.za/rfc/rfc1808.txt
http://www.ietf.org/rfc/rfc2396.txt
ldap://[2001:db8::7]/c=GB?objectClass?one
mailto:John.Doe@example.com
news:comp.infosystems.www.servers.unix
tel:+1-816-555-1212
telnet://192.0.2.16:80/
urn:oasis:names:specification:docbook:dtd:xml:4.1.2
```

Thus, User A may send the URI "http://Desktop.local/Music/Love.mp3" to another user, User C, to allow User C to use a communication device 210 to click on the link and download the song to share. However, the URI does not identify the network User A intends to be used by User C (e.g., Network A 220a). Thus, clicking on the link may fail to direct User C to the content. User C needs to know that she must connect to "Network A" 220a before she can download the song through the URI.

Additionally, without specification of the network, the URI may be ambiguous. For example, the communication device 210 of User C may be in a range in which Network A 220a, Network B 220b and other networks, such as Network C 220c, may overlap. Thus, User C is in the range of "Network A" 220a, "Network B" 220b and "Network C" 220c. If User B has content on his home computer on "Network B" 220b, different content on Network B 220b may have the same URI as the content User A desires to share with User C, "http://Desktop.local/Music/Love.mp3." Depending upon which network User C connects to, she will get different resources.

One way of addressing this issue is illustrated in FIGS. 2A-2C. In this regard, when a user clicks on a URI link in a text message (FIG. 2A), a web browser application is launched (FIG. 2B), and the user is prompted to select an access point (unless a default one has been set) from a list of available access points (FIG. 2C). An access point is the entry to a network.

In accordance with embodiments of the present invention, an extension to the URI syntax is provided to include an identifier of the network. In this regard, to accommodate scenarios where multiple networks coexist and overlap, an optional "network" component may be added ahead of "host." Thus, the "host" may be modified to be in a specified "network." This allows two or more networks to use an otherwise identical URI to refer to different resources within their own context without causing ambiguity to an outside user.

Thus, in the URI syntax, the "authority" component is changed accordingly. Definitions of other components may remain the same. In accordance with an embodiment of the present invention, the URI syntax may be as follows:

```
authority = [ userinfo "@" ] [ network "@@" ] host [ ":" port ]
network = *( unreserved / pct-encoded / sub-delims )
```

Thus, in the example described above, the pathname of the content, or URI, provided by User A, "http://Desktop.local/Music/Love.mp3," may be replaced by "http://NetworkA@@Desktop.local/Music/Love.mp3," where "NetworkA" is the network identifier (see FIG. 3).

Thus, in one embodiment, in addition to including the identifier of the wireless network, the URI includes a delimiter to specify the location of the identifier of the network within the URI. In the above-described embodiment, the delimiter is "@@" and is positioned between "network" and "host" to avoid ambiguity when the URI is parsed. In conventional URI syntax, the literal string of "@@" should never appear in any valid URI (unless at least one of them is percent-encoded), therefore it is safe to select "@@" as the delimiter to separate the network identifier from host information. Thus, in one embodiment, the URI has the format "networkname@@hostname/contentaddress", where "networkname" is the identifier of the wireless network, "hostname" indicates a host device on the wireless network, and "contentaddress" indicates the location of the content on the host device.

When the user clicks the link for the URI, a request for the content is sent. On the network side, the request for the content may be received by the access point, for example. As noted above, the access point may be a wireless router. The access point, or another component of the network, may then parse the pathname received with the request. In parsing the pathname, the identifier of the wireless network may be extracted. If the identifier of the wireless network corresponds to the wireless network of the access point performing the parsing, access to the requested content may be provided. On the other hand, if the identifier of the wireless network does not correspond to the wireless network of the access point performing the parsing, the request may be ignored.

Existing URI parsers may easily adopt the extended syntax in accordance with embodiments of the present invention. The "host" part of the URI remains the same unless "@@" is detected. When the delimiter "@@" is detected, the part before the delimiter is then the identifier of the wireless network, and the part after the delimiter is host information. The rest of the URI is not affected.

As an example, possible changes to the Python parser will be described. Python has a urlparse module that parses a URL/URI string and returns an instance of a subclass of tuple with the following attributes: scheme, netloc, path, parameters, query, fragment, username, password, hostname and port. See below for an example from the Python interactive shell.

```
>>> from urlparse import urlparse
>>> o =
urlparse('http://Cindy:SeCrEtPaSsWoRd@Desktop.local:8080/Music/
    Love.mp3')
    >>> o.username
    'Cindy'
    >>> o.password
    'SeCrEtPaSsWoRd'
    >>> o.hostname
    'desktop.local'
    >>> o.port
    8080
    >>> o =
urlparse('http://Cindy:SeCrEtPaSsWoRd@AliceNet@@Desktop.-
    local:8080/Music/Love.mp3')
    >>> o.username
    'Cindy'
    >>> o.password
    'SeCrEtPaSsWoRd'
    >>> o.hostname
    'alicenet@@desktop.local'
    >>> o.port
    8080
    >>>
```

Thus, the urlparse module does not handle the above-described extension to the URI syntax in any specific way. After urlparse is done, the "hostname" attribute can be split at the delimiter "@@" to get the identifier of the wireless network if there is one. We revisit the example in Python interactive shell below.

```
>>> from urlparse import urlparse
>>> o = urlparse('http://Cindy:SeCrEtPaSsWoRd@Desktop.local:8080/
Music/Love.mp3')
>>> o.hostname
'desktop.local'
>>> o.hostname.split('@@')
['desktop.local']
>>> o =
    urlparse('http://Cindy: SeCrEtPaSsWoRd@AliceNet@@Desktop.-
    local:8080/Music/Love.mp3')
>>> o.hostname
'alicenet@@desktop.local'
>>> o.hostname.split('@@')
['alicenet', 'desktop.local']
>>>
```

Thus, in accordance with embodiments of the present invention, embedding the network identifier into the URI, the separate step for the user to select the network to be used may be eliminated. Syntactically, the ambiguity in the URI when multiple networks coexist and overlap is also eliminated.

Figure 4:
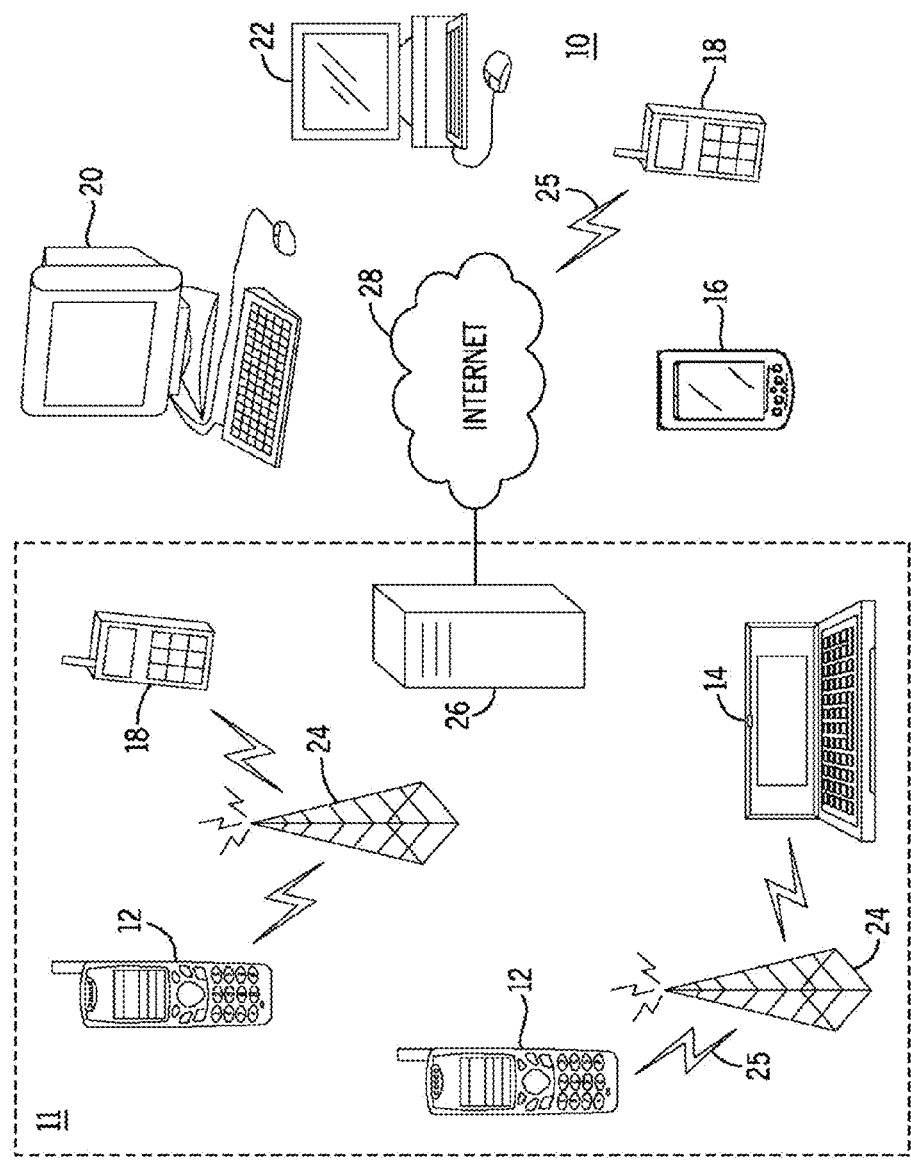
FIG. 4 is an overview diagram of a system within which various embodiments of the present invention may be implemented.

FIG. 4 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 4 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The example communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 5:
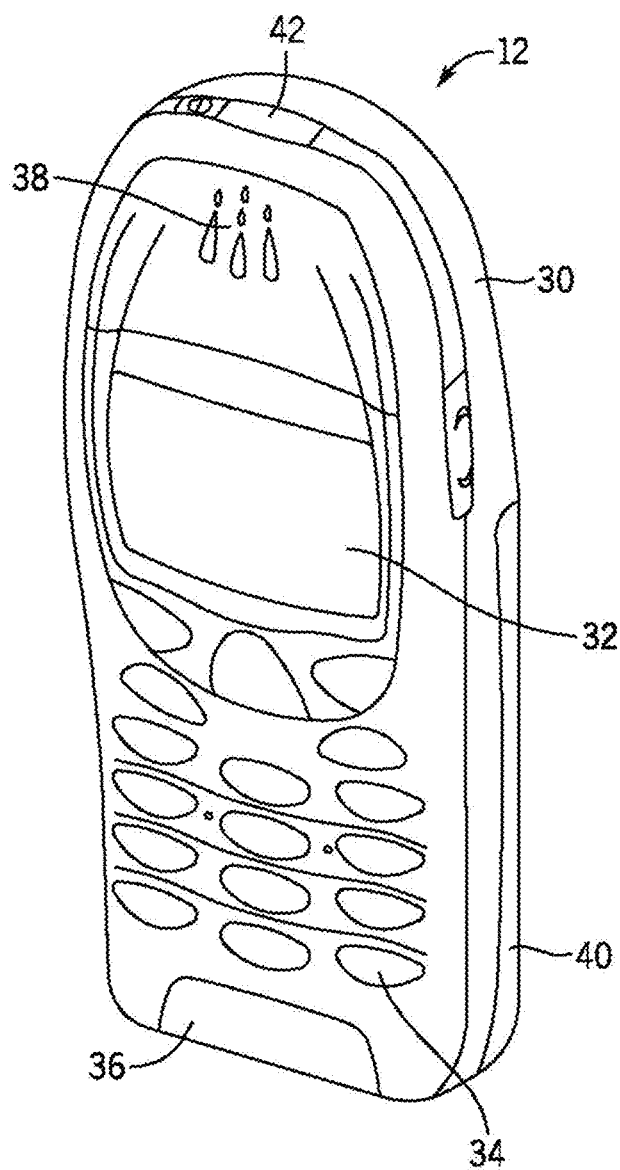
FIG. 5 illustrates a perspective view of an example electronic device which may be utilized in accordance with the various embodiments of the present invention.
Figure 6:
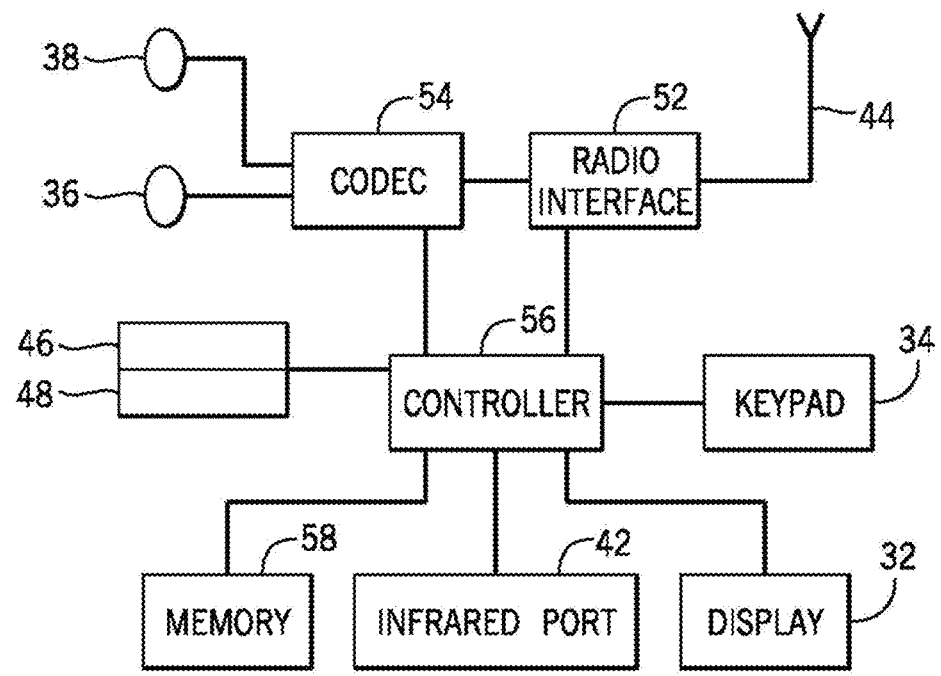
FIG. 6 is a schematic representation of the circuitry which may be included in the electronic device of FIG. 5.

FIGS. 5 and 6 show one representative electronic device 12 which may be used as a network node in accordance to the various embodiments of the present invention. It should be understood, however, that the scope of the present invention is not intended to be limited to one particular type of device. The electronic device 28 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 12 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   forming a universal resource indicative of a location of content on a wireless network, the universal resource indicator including:
   a host name associated with a device on the wireless network; and
   a network name associated with the wireless network prepended to the host name, wherein the universal resource indicator includes a delimiter inserted between the network name and the host name, wherein the network name is a global address and the host name is a local address; and
   sending a request for the content, the request including the universal resource indicator.

2. The method of claim 1, wherein the delimiter is "@@".

3. The method of claim 2, wherein the universal resource indicator is configured as networkname@@hostname/contentaddress, wherein:
   "networkname" comprises the network name associated with the wireless network;
   "hostname" comprises the device on the wireless network; and
   "contentaddress" comprises the location of the content on the device.

4. An apparatus, comprising:
   a processor, and memory including computer program code, the memory and the computer program code configured to, working with the processor, cause the apparatus to perform at least the following:
   form a universal resource indicator indicative of a location of content on a wireless network, the universal resource indicator including:
   a host name associated with a device on the wireless network; and
   a network name associated with the wireless network prepended to the host name, wherein the universal resource indicator includes a delimiter inserted between the network name and the host name, wherein the network name is a global address and the host name is a local address; and
   send a request for the content, the request including the universal resource indicator.

5. The apparatus of claim 4, wherein the delimiter is "@@".

6. The apparatus of claim 5, wherein the universal resource indicator is configured as networkname@@hostname/contentaddress, wherein:
   "networkname" comprises the network name associated with the wireless network;
   "hostname" comprises the device on the wireless network; and
   "contentaddress" comprises the location of the content on the device.

7. A computer program product, embodied on a non-transitory computer-readable medium, comprising:
   computer code for forming a universal resource indicator indicative of a location of content on a wireless network, the universal resource indicator including:
   a host name associated with a device on the wireless network; and
   a network name associated with the wireless network prepended to the host name, wherein the universal resource indicator includes a delimiter inserted between the network name and the host name, wherein the network name is a global address and the host name is a local address; and
   computer code for sending a request for the content, the request including the universal resource indicator.

8. The computer program product of claim 7, wherein the delimiter is "@@".

9. The computer program product of claim 8, wherein the universal resource indicator is configured as networkname@@hostname/contentaddress, wherein:
   "networkname" comprises the network name associated with the wireless network;
   "hostname" comprises the device on the wireless network; and
   "contentaddress" comprises the location of the content on the device.

* * * * *